Patented May 5, 1925.

1,537,043

UNITED STATES PATENT OFFICE.

JOSEPH W. DUBRAKS, OF HOUSTON, TEXAS.

BREAD COMPOUND.

No Drawing.   Application filed December 27, 1923.  Serial No. 682,909.

*To all whom it may concern:*

Be it known that I, JOSEPH W. DUBRAKS, a citizen of the United States, residing at Houston, Texas, have invented a certain new and useful Improvement in Bread Compounds, of which the following is a specification.

My invention relates to a composition for making bread, and method of treating the same.

It is an object of my invention to provide a compound of ingredients for making bread whereby the product will be light and nutritious and will remain moist and fresh for relatively long periods of time without deterioration.

Another object is to provide a bread composition which, when properly treated, will produce a loaf of bread having the desired home made flavor and which may be sold cheaply.

It is also desired to provide a method of treatment of ingredients whereby rice may be employed with wheat flour in the making of the bread, thereby obtaining the benefit of the great nutritious qualities of the rice and making a valuable market for what is now largely a waste product.

In preparing the rice, which is one of the most important ingredients, it is found that rice flour does not improve the qualities of the bread and in fact, is not desirable. Grinding the rice grain breaks up the cell particles and impairs its value. When rightly prepared, however, rice will vastly improve the value of the loaf. Any grade of clean rice may be employed and good results are obtained from the fine cracked rice usually sold cheaply because it is cracked. This rice is boiled in water until thoroughly cooked, enough water being used to form a pasty mass. This rice in the mass will separate from the water, on standing and, to obtain proper results, the rice paste, while still warm, must be run through a homogenizing machine, whereby the water and rice are so intimately blended as to remain in emulsion thereafter.

This rice and water emulsion when thus treated is employed with wheat flour and other ingredients in proportions about as follows:

196 lbs. of flour, 100 lbs. of rice emulsion, 32 lbs. of water, 4 lbs. of salt, 4 lbs. of yeast, 14 lbs. of sugar, 3 lbs. of lard.

It will be noted that the usual milk constituent ordinarily employed in making the best quality of bread is omitted, where the rice emulsion is used and no eggs are necessary. The quantities are such as may be necessary for a large batch of bread in bakeries and the treatment of the bread in mixing, raising, kneading, etc., will be not materially different from that now used, the rice being added with the yeast before raising. It is the use of the rice, as thus prepared, as a substitute for some of the wheat flour, and also for milk in the composition, which makes the great improvement in the process.

The treatment of the rice for use is of the greatest importance and is the key to the success of the invention. Bread thus prepared is light of color and fine in texture. It has the fine flavor usually obtained in the so-called "home made" bread and, most important of all, it will not get stale for a week or more. Bread thus made, retains its fresh consistency and flavor for about two weeks. It, therefore, is not only economical to make but is a source of further economy in that it will not waste readily by going stale. It is desirable for use on ships, in that it will remain fresh during an ordinary voyage. Further objects and advantages will be obvious to one skilled in the art.

What I claim as new is:

1. A bread composition having for its cereal ingredients white wheat flour and an emulsion of cooked rice grains treated in a homogenizer in the proportions of about two parts of wheat flour to one of rice emulsion by weight.

2. A bread composition having for its cereal ingredients two parts of wheat flour to one of homogenized cooked rice.

3. A bread composition comprising ingredients in proportions approximately as follows: wheat flour, 196 pounds; rice emulsion, 100 pounds; water, thirty-two pounds; salt, four pounds; yeast, four pounds; sugar, fourteen pounds; lard, three pounds, said rice emulsion being homogenized cooked rice and water of the character specified.

In testimony whereof I hereunto affix my signature this 24th day of December, A. D. 1923.

JOSEPH W. DUBRAKS.